UNITED STATES PATENT OFFICE.

GEORGE BOWER AND ANTHONY S. BOWER, OF ST. NEOTS, ENGLAND.

COATING IRON WITH OXIDE.

SPECIFICATION forming part of Letters Patent No. 234,524, dated November 16, 1880.

Application filed September 3, 1880. (No specimens.) Patented in Great Britain April 1, 1878.

*To all whom it may concern:*

Be it known that we, GEORGE BOWER and ANTHONY SPENCER BOWER, subjects of the Queen of Great Britain, and residing respectively at St. Neots, county of Huntingdon, England, have invented certain Improvements in Effecting the Protection of Iron and Steel, (for which we have obtained a patent in Great Britain, No. 1,280, April 1, 1878,) of which the following is a specification.

This invention relates to the protection of cast or wrought iron and of cast or wrought steel surfaces from oxidation or corrosion by atmospheric or other influences; and it consists in the formation of a protective film or coating thereon of oxide or of oxides of iron by the action of carbon dioxide ($CO_2$) at a suitable temperature.

The carbon dioxide ($CO_2$) may be produced by any suitable method, but preferably by the combustion of carbon monoxide, (CO,) which carbon monoxide is produced by any well-known and suitable means.

The chemical changes which take place, and on which the process is based, are the following: The carbon dioxide, in presence of iron or steel at a suitably-elevated temperature, parts with one atom of oxygen, which it gives up to the said iron or steel, forming an oxide or oxides of iron, and then passes off as carbon monoxide, (CO,) which carbon monoxide can, if necessary, be reconverted by combustion in a sufficient amount of air or of oxygen into carbon dioxide ($CO_2$.)

In carrying out this process when applied to iron or steel objects, the surfaces of which it is required to protect, they are either subjected to the action of heat in a retort or other suitable apparatus, which may be heated externally and the carbon dioxide ($CO_2$) passed directly in among and over the articles under treatment; or the said articles may be directly heated or partly heated by the actual combustion of the carbon monoxide in presence of a sufficient supply of air, the supply of which air may be regulated by suitable valves or other contrivances; or the articles themselves may be heated by employing a highly-heated current of the carbon dioxide in lieu of or in conjunction with the carbon dioxide at the ordinary temperature; or the necessary carbon monoxide (which is to produce by its combustion the carbon dioxide) may be obtained directly from the fuel which is employed to effect the heating of the chamber in which the articles under treatment are placed, the fuel being burned under such conditions that the products of combustion may be largely composed of carbon monoxide, which carbon monoxide is led by suitable pipes or other contrivances into the chamber over and among the articles contained therein, and burned along with or in conjunction with a sufficient amount of air, so as to convert it partly or entirely into carbon dioxide.

It has been found to be advantageous in carrying out this process to have the surfaces of the iron slightly coated with sesquioxide of iron before submitting the same to the action of the carbon dioxide or to the carbon monoxide which is to produce the aforesaid carbon dioxide, and this applies more especially to articles of wrought-iron.

In order to obtain a coating of this sesquioxide of iron and then convert or reduce it to the magnetic or black oxide, the following modification of the before-mentioned processes may be adopted when necessary: The carbon monoxide is mixed with a larger quantity of air (preferably superheated) than is requisite for conversion into carbon dioxide, and is passed into the chamber over and among the articles. The free oxygen in the excess of air combines with the iron to form a superficial coating of sesquioxide of iron. After this formation of sesquioxide has continued for a sufficient length of time, which is determined by the temperature employed and the use for which the articles may be designed, (half an hour will be found in the majority of cases to be quite sufficient,) carbon monoxide, without admixture with free oxygen or air, is admitted in sufficient quantity to reduce this sesquioxide, and by its consequent conversion into carbon dioxide form in its place a film of the requisite magnetic oxide. The time for which the carbon monoxide alone is allowed to circulate in the chamber is dependent on the temperature and amount of sesquioxide formed in the first operation; but, as a rule, three minutes exposure of the articles to carbon monoxide is found to be sufficient.

These operations may be continued as often as necessary, according to the thickness of the protective film required.

The temperature which it is preferred to adopt in carrying out this process ranges from a dull to a bright red heat.

The metallic objects upon which it is proposed to form a protective film or surface of the desired oxide or oxides of iron may be composed either of cast malleable or cast or wrought iron or of cast or wrought steel.

The metallic objects are to be submitted to the action of the before-mentioned agent, in the manner above described, until the protective film or covering of the desired thickness shall have been formed upon the exterior surface or portion of the same, and when such requisite film or coating has been formed the metallic objects may be allowed to cool, and are then ready for useful application in the arts.

We claim as our invention—

The mode herein described of protecting iron and steel from corrosion—that is, by forming a protective coating thereon of oxide or oxides of iron by the action of carbon dioxide at an elevated temperature, all substantially as set forth.

In testimony whereof we have signed our names to this specification in the presence of two subscribing witnesses.

GEO. BOWER.
ANTHONY S. BOWER.

Witnesses:
WM. J. WEEKS,
GEORGE PAYNE,
 Both of 31 Lombard Street, London.